United States Patent [19]
Williams et al.

[11] Patent Number: 4,721,062
[45] Date of Patent: Jan. 26, 1988

[54] METHOD OF RAISING ROOSTING FOWL

[75] Inventors: Thomas D. Williams; Roger Williams, both of Miami, Fla.

[73] Assignee: Quail Roost Quail Farms, Miami, Fla.

[21] Appl. No.: 719,865

[22] Filed: Apr. 4, 1985

[51] Int. Cl.4 ............................................. A01K 31/00
[52] U.S. Cl. ..................................................... 119/21
[58] Field of Search ............................. 119/21, 30, 31

[56] References Cited

U.S. PATENT DOCUMENTS 2,257,734 10/1941 Cornell .................................. 119/21
2,314,344 3/1943 Cornell .................................. 119/21

OTHER PUBLICATIONS

M. P. S. Haywood, "Quail Production," Ministry of Agriculture, Fisheries and Food, 1981.
G.Q.E. Manufacturing Company, *Sportsmen and Game Breeders Catalogue*, Jan. 1, 1983.
Albert F. Marsh, *Quail Manual*, 8th Edition, (Marsh Farms Publications: Garden Grove, Calif., 1965).
H. R. Wilson, et al, *Bobwhite Quail Production*, by Institute of Food and Agricultural Sciences, University of Florida, Gainesville, Information Series 75-1.
*Coturnix Quail Husbandry in the Laboratory*, (Marsh Farms Publications: Garden Grove, Calif., Dec. 1977).
Stromberg, *A Guide to Better Hatching*.
Podom, *Raising Coturnix Quail for Meat*.
*Japanese Quail Husbandry in the Lab*, Woodard et al.

*Primary Examiner*—John J. Wilson
*Attorney, Agent, or Firm*—Wegner & Bretschneider

[57] ABSTRACT

A process for raising roosting fowl includes subjecting newly-hatched fowl to infrared radiation for a limited period of time and decreasing visible light. The fowl mature in substantially total darkness. Temperature is controlled to keep the fowl comfortable. The fowl are given a protein rich diet for a time sufficient to allow substantially complete bone structure formation, at which time they are switched to a high carbohydrate diet to increase meat weight. The process reduces stress on the birds and keeps them docile, resulting in decreased handling, faster maturing, increased meat versus bone ratio and increased bird numbers per area of raising space.

29 Claims, No Drawings

METHOD OF RAISING ROOSTING FOWL

BACKGROUND OF THE INVENTION

1. Field of the Invention

The present invention is directed to a process for raising roosting fowl. More specifically, the present invention involves a process in which surroundings of the fowl being raised are controlled to allow an increase in the number of fowl which can be raised in a given area as well as the useful weight of each fowl, with a decrease in the time necessary for maturation.

2. Description of the Prior Art

Past commercial processes for raising roosting fowl have involved large pens and inexact control over environmental conditions. Substantial amounts of space per bird are required. The stressful conditions of such processes have resulted in the necessity of additional handling steps, such as debeaking.

SUMMARY OF THE INVENTION

It is an object of this invention to provide a process for raising roosting fowl to provide increased numbers of birds in a given area and increased yield in the meat produced per bird.

It is a further object of this invention to provide a process for raising roosting fowl in which the birds mature more quickly.

It is still further object of this invention to provide a process for raising roosting fowl in which the fowl propagate earlier and produce more eggs.

It is a still further object of this invention to provide a process for raising roosting fowl yielding birds weighing 45-55% more while consuming less feed per pound of meat produced.

It is a still further object of this invention to provide a process for raising roosting fowl in which handling steps are minimized and which is suitable for automation.

The above objects and others are obtained by a process for raising roosting fowl which includes subjecting hatched fowl to infrared light. Enough visible light is provided so that the fowl can become aquainted with their surroundings. The amount of visible light is decreased gradually, and eventually the birds are subjected to total darkness. The initial diet is high protein, which is continued for a period sufficient to allow the proper formation of bone structure. This is followed by a high carbohydrate diet. The temperature at which the fowl are housed is decreased gradually until it reaches a point providing optimum comfort for the fowl.

DETAILED DESCRIPTION OF THE INVENTION

The present process is directed to the raising of roosting fowl. The term "roosting fowl" covers both conventional "domestic" roosting fowl such as chickens and "wild" or "game" roosting fowl such as quail and pheasant.

According to the process, eggs are collected daily and the eggs collected are placed in an incubator about once every week. This is done to ensure freshness and increase the hatch rate. The eggs are kept in the incubator for the standard time, for example about 14 days for quail and about 21 days for pheasant. As is known in the art, the eggs can be subjected to tipping and rotation in the incubator to allow for exercise of the embryo. From the incubator, the eggs are transferred to a hatcher for the standard time, three days for quail, four and one-half days for pheasant. The incubation and hatching can take place in known incubating and hatching devices.

After allowing sufficient time for the hatched chicks to become dry and to allow their feathers to fluff (usually about 12 hours), the chicks are transferred to a cage. The cage may be provided with a layer of paper matting on its floor. Conventional non-disintegrating paper matting presently used with cage-type brooders can be used. Preferably a paper is used which disintegrates after a week or so under the mechanical duress of the chicks exercising their legs and the chemical action of the birds' waste. The paper preferably is thin ($\sim 0.05$ inch) and layered to have a spongy, resilient quality to promote good footing and enable the growing chicks to develop their legs and feet properly. The paper is absorbent to promote cleanliness. Papers presently sold by Kimberly-Clark under the names "Cushioning Surface Protection Soakers" K-34 and K-35 are contemplated as useful papers for this function.

After about the first week, the paper matting begins to disintegrate. Since the cage preferably has a mesh bottom and is elevated, paper and manure drop through the floor, increasing the cleanliness of the birds and decreasing the possibility of disease. A conveyor belt can be provided beneath the cage to carry waste away.

The chicks first are subjected to red light. This can come from a standard red light bulb. It has been found that better results are obtained with lower intensity red light. For example, a 3.5 lux red light source gave better results than an 11 lux red light source. The red light source may be a commercially available Westinghouse 60 Watt, 115-125 Volt red bulb. The red light source is used to illuminate the enclosures in which the cages are located; and the red light source should be no more than about three feet away from the birds with all birds fully exposed to the light. The red light treatment continues for a time sufficient to result in enlargement of the testes and ovaries of the chicks, generally about 2 to 3 fold. This usually occurs in about two weeks. It is necessary at this time to provide enough visible light for the chicks to become acquainted with their surroundings and where food and water supplies are, and to learn how to eat and drink. The 3.5 lux red light source has been found sufficient for this function. After about the first week, the aforementioned necessity for the visible light ceases. It is preferred that no additional light beyond the red light be used if possible.

After about two weeks, the red light is turned off and replaced with light of less brightness, such as a standard blue light. The blue light also may be a commercially available Westinghouse 60 Watt, 115-125 Volt bulb. This dimmer light is continued for about two weeks and while preferably being turned off gradually, leaving the birds in substantially total darkness. An automatic rheostat may be used to decrease the intensity of the light gradually and automatically. The net effect of the changing lights is to provide a gradual dimming to darkness. Thus, after the fourth week, the birds are subjected to total darkness until they reach the point where further feed consumption results in little or no additional meat weight gain (about 5-6 more weeks for quail, about 16 more weeks for pheasant). The fowl become very calm as the light is decreased, allowing much greater numbers of birds to be raised in a given area. Although the process is effective when the birds are subjected to immediate darkness following the red light treatment or if the blue light is not gradually decreased, this is not as efficient as a more gradual process of subjecting them to darkness. If necessary, the darkness can be interrupted briefly for activities such as cleaning, inspection for disease, etc.

It has been discovered that the darkness seems to caponize the birds temporarily and greatly reduces the sex drive in the birds. When breeders are chosen and removed from the process, it has been found to take approximately six weeks before their fertility returns to normal.

The newly hatched chicks are given a very high protein diet initially. For the first week, the chicks are given a standard high protein feed, such as that sold by Ralston Purina under the name "Startena", which is about 30% protein, supplemented with a high protein supplement. The powdered protein supplement is made of dehydrated or freeze dried eggs and brings the total protein content to about 40%. Also, the water provided to the chicks can be supplemented with a high nutrient supplement, such as that sold under the name "Headstart" by Whitmoyer Laboratories, which includes protein, vitamins and stress-preventing additives. The supplements are added according to the manufacturer's directions. After about a week, the supplements may be discontinued. The high protein feed is continued for a time sufficient to allow formation of the bone structure in the birds, usually about four more weeks, for a total of five weeks.

After about five weeks (the time for formation of bone structure), the high protein feed is replaced with a high carbohydrate feed, such as that sold under the name "Finisher" by Ralston Purina. It has been found that the high carbohydrate feed is better at promoting development of the meat and fat tissues. It has been discovered that birds raised according to the present process consume no more feed than birds raised conventionally but weigh about 45-55% more, with a higher meat to bone ratio. It is believed that the specific feeds and supplements used are not critical, and that any feeds and supplements of similar quality could be used with comparable results.

To decrease stress and maintain the comfort of the fowl, a gradually decreasing temperature is provided. The initial temperature is close to that of the hatchery, about 99.5° Fahrenheit. The temperature is decreased gradually, for example by 1° Fahrenheit per day, until an optimum temperature for the birds' comfort is reached, for example about 76-79° Fahrenheit. The optimum temperature then is maintained for the duration of the maturation process.

The light and temperature aspects of the process are intended to reduce stress on the fowl and keep the fowl calm and docile. With the present process, there is no need to debeak the birds and provide them with "peepers" and "beak rings" to prevent cannibalism among the birds. The claming conditions also allow significant increases in the number of birds which can be raised in a given area. For example, according to conventional quailraising processes, there are no more than about two or three birds per square foot. The present process has been used successfully with up to 6-7 quail per square foot. According to conventional pheasant-raising processes, each bird requires about 25 square feet. The present process has been practiced successfully in raising 200 pheasants in an area of 120 square feet, well less than one square foot per bird (about 0.6 square feet per bird).

The present invention also provides significant increases in the rate of maturation. It has been found that quail raised according to the present process are fully mature and ready for harvesting within 9-10 weeks of hatching, with hens generally weighing slightly more than cocks. With conventional processes it takes about 18-20 weeks to raise quail to be ready for harvest. Pheasants raised according to the present process were fully plumed after 20 weeks. Pheasants raised in accordance with conventional processes did not reach this stage unitl 30 days later and at 20 weeks weighed 9-10 ounces less than their counterparts raised in accordance with the present process. Furthermore, the birds raised according to the present process have a significantly greater percentage of meat versus bone. A six-ounce quail raised according to the present invention generally has about one half ounce of bone. A six-ounce quail raised conventionally generally will have about one and one half ounces of bone.

Although it is desirable to sex the chicks after hatching and keep males and females separate during the maturation process to decrease stress, it has been found that breeding can occur during the darkness phase, at about six weeks from hatching, although at reduced efficiency. Egg production also is reduced in the darkness. Thus, it is desirable to remove "breeders" after several weeks of darkness and allow breeding to occur under more natural conditions. It has been discovered that the "breeders" from the present process show significant increases in egg production, perhaps due to the enlargement of the ovaries, after removal from darkness and adjustment to the light. Quail hens from the present process lay approximately one egg per day. Generally quail hens are expected to lay only about 200 eggs per year. Studies have indicated that eggs from breeders from the present process contain less cholesterol than eggs from breeders from conventional processes. Pheasant hens from the present process lay eggs approximately every other day, and lay fertile eggs year-round. Generally, pheasant hens are expected to lay about 30-40 eggs per year, and lay fertile eggs only in the early spring.

At the end of the darkness phase, the fowl are ready for harvesting. However, if harvesting is not desired at this stage, the birds can be transferred to conventional outdoor pens. Since the birds will not retain their docility after being removed from the darkness, it is necessary at least to provide the birds with peepers and beak rings to prevent cannibalism. Peepers obstruct the forward (but not side) vision of the birds, so that the birds cannot see to peck other birds. Beak rings prevent the birds from grasping and plucking feathers from other birds. Both devices are well known. Also, the birds exhibit weight loss due to their increased activity following removal from darkness. Thus, it is preferred to harvest the birds directly after the darkness phase if the birds are to be used as meat.

The present invention completely eliminates the need for a "brooder" or "brooder room" as used in conventional processes. Brooders require very large amounts of labor, while brooder rooms, which require less labor, take up extremely large amounts of space. Since there is no requirement for handling of the birds other than transfer to the cages after hatching and removal at maturity, the present process is well-suited for automation. For example, the cages can be set up in sealed structures having computerized automatic light and temperature controls, and can be provided with automatic feeding and manure removal devices. The structures can be provided with a forced filtered airflow, and cooling via a water evaporation system. The controlled environment, as noted above, calms the birds and reduces the chances for disease.

A cage useful in such an automated process would include a mesh bottom, as discussed above. A conveyor for removing waste runs beneath the cage. The cage bottom is pivotable between a closed and opened position. When closed, the bottom abuts the bottom of one of the sidewalls of the cage while being pivoted at the opposite sidewall. When open, there is a space between the bottom and the one sidewall sufficient to allow eggs to roll out of the cage. The bottom thus is at a slight angle to horizontal when open. Adjacent the one sidewall is a feed trough with a standard automatic feeder. To allow feeding at the chick stage, the lower portion of the one sidewall of the cage includes a plate provided with orifices to provide access to the feed trough for the chicks through the plate. The feed trough can be provided with a closable chick escape guard over its top opening. Water preferably is provided with an "on demand" water system to avoid standing water as much as possible.

After about five weeks, the bottom of the cage pivots out of abutment with the sidewall of the cage to provide an opening through which the eggs can pass to a standard egg conveyor. The floor of the cage thus is at a slight angle to horizontal. By this time, the birds have grown enough so that escape through the opening between the floor and sidewall is not possible. At this time, a solid plate slides down to block the access openings in the sidewall of the cage, and the escape guard opens so that the more mature birds will feed from the trough by reaching through the wire sidewall and over the plate rather than through the plate. The opened cage floor can lead to a standard egg conveyor, which will carry away the eggs laid during the maturation process. The eggs roll to the conveyor due to the incline in the cage floor. In an alternative embodiment, there can be a permanent space between the cage bottom and sidewall, temporarily closed by flaps.

Access to the cage can be provided by having part of the upper sidewall of the cage formed as an inwardly pivotable door. The upper frame portion of the door can engage two hinges. The hinges can be provided with slots to allow the easy removal of the door from the hinges. The hinges can be set slightly forward of the remainder of the sidewall so that the door will remain closed automatically. A number of the cages can be stacked in a "battery" type of arrangement.

Although a detailed description of the present invention has been provided above, the present invention is not limited thereto, but rather is defined in the following claims.

We claim:

1. A process for raising roosting fowl, comprising:
   subjecting hatched fowl to red light for a period sufficient to induce enlarged reproductive organs in said fowl, and providing sufficient light for said fowl to become aquainted with their surroundings;
   stopping said red light and subjecting said fowl to a decreased amount of light; and
   then subjecting said fowl to substantially total darkness until the fowl reach a desired state of growth.

2. A process for raising roosting fowl according to claim 1, wherein the hatched fowl are given a protein rich diet for a period sufficient to allow substantially complete formation of bone structure.

3. A process for raising roosting fowl as claimed in claim 2, wherein said protein rich diet is replaced with a carbohydrate rich diet after the period sufficient to allow substantially complete formation of bone structure has passed.

4. A process for raising roosting fowl as claimed in claim 3, wherein said protein rich diet includes a high protein feed supplement for at least part of the time during which said protein rich diet is given.

5. A process for raising roosting fowl as claimed in claim 4, wherein said protein rich diet includes a protein rich additive for enriching the water provided for said fowl, for at least part of the time during which said protein rich diet is given.

6. A process for raising roosting fowl, comprising:
   subjecting hatched fowl to red light for about two weeks, and providing sufficient light for said fowl to become aquainted with their surroundings;
   stopping said red light and subjecting said fowl to a decreased amount of light for about one week; and
   subjecting said fowl to substantially total darkness until the fowl reach a desired state of growth.

7. A process for raising roosting fowl as claimed in claim 6, wherein said decreased amount of light is provided by a blue light.

8. A process for raising roosting fowl as claimed in claim 6, wherein said fowl are subjected to temperatures which are gradually decreased until a suitable temperature for fowl comfort is reached.

9. A process for raising roosting fowl as claimed in claim 8, wherein the temperature is decreased from a temperature substantially equal to that at which the fowl were hatched at a rate of about 1° Fahrenheit per day.

10. A process for raising quails, comprising:
    subjecting hatched quails to red light for a period sufficient to induce enlarged reproductive organs in said quails, and providing sufficient light for said quails to become aquainted with their surrounding;
    stopping said red light and subjecting said quails to a decreased amount of light; and
    then subjecting said quails to substantially total darkness until the quails reach a desired state of growth.

11. A process for raising quails according to claim 10, wherein hatched quails are given a protein rich diet for a period sufficient to allow substantially complete formation of bone structure.

12. A process for raising quails as claimed in claim 11, wherein said protein rich diet is replaced with a carbohydrate rich diet after the period sufficient to allow substantially complete formation of bone structure has passed.

13. A process for raising quails as claimed in claim 12, wherein said protein rich diet includes a high protein feed supplement for at least part of the time during which said protein rich diet is given.

14. A process for raising quails as claimed in claim 13, wherein said protein rich diet includes a protein rich additive for enriching the water provided for said quails, for at least part of the time during which said protein rich diet is given.

15. A process for raising quails, comprising;
    subjecting hatched quails to red light for about two weeks, and providing sufficient light for said quails to become aquainted with their surroundings;

stopping said red light and subjecting said quials to a decreased amount of light for about one week; and subjecting said quails to substantially total darkness until the quails reach a desired state of growth.

16. A process for raising quails as claimed in claim 15, wherein said decreased amount of light is provided by a blue light.

17. A process for raising quails as claimed in claim 15, wherein said quails are subjected to temperatures which are gradually decreased until a suitable temperature for quail comfort is reached.

18. A process for raising quails as claimed in claim 17, wherein the temperature is decreased from a temperature substantially equal to that at which the quails were hatched at a rate of about 1° Fahrenheit per day.

19. A process for raising quails as claimed in claim 18, wherein the temperature is decreased from about 99.5° Fahrenheit to about 76–79° Fahrenheit.

20. A process for raising quails as claimed in claim 15, wherein said quails are subjected to substantially total darkness for a period of about 5 weeks.

21. A process for raising pheasants, comprising:
subjecting hatched phesants to red light for a period sufficient to induce enlarged reproductive organs in said pheasants, and providing sufficient light for said pheasants to become aquainted with their surrounding;

stopping said red light and subjecting said pheasants to a decreased amount of light; and then subjecting said pheasants to substantially total darkness until the pheasants reach a desired state of growth.

22. A process for raising pheasants according to claim 21, wherein hatched pheasants are given a protein rich diet for a period sufficient to allow substantially complete formation of bone structure.

23. A process for raising pheasants as claimed in claim 22, wherein said protein rich diet is replaced with a carbohydrate rich diet after the period sufficient to allow substantially complete formation of bone structure has passed.

24. A process for raising pheasants as claimed in claim 23, wherein said protein rich diet includes a high protein feed supplement for at least part of the time during which said protein rich diet is given.

25. A process for raising pheasants as claimed in claim 24, wherein said protein rich diet includes a protein rich additive for enriching the water provided for said pheasants, for at least part of the time during which said protein rich diet is given.

26. A process for raising pheasants, comprising:
subjecting hatched pheasants to red light for about two weeks, and providing sufficient light for said pheasants to become aquainted with their surroundings;

stopping said red light and subjecting said pheasants to a decreased amount of light for about one week; and subjecting said pheasants to substantially total darkness until the pheasants reach a desired state of growth.

27. A process for raising pheasants as claimed in claim 26, wherein said decreased amount of light is provided by a blue light.

28. A process for raising pheasants as claimed in claim 26, wherein said pheasants are subjected to temperatures which are gradually decreased until a suitable temperature for pheasant comfort is reached.

29. A process for raising pheasants as claimed in claim 28, wherein the temperature is decreased from a temperature substantially equal to that at which the pheasants were hatched at a rate of about 1° Fahrenheit per day.

* * * * *